United States Patent
Liu et al.

(10) Patent No.: US 11,722,966 B2
(45) Date of Patent: *Aug. 8, 2023

(54) METHODS AND APPARATUSES FOR POWER CONTROL

(71) Applicant: LENOVO (BEIJING) LIMITED, Beijing (CN)

(72) Inventors: Hongmei Liu, Beijing (CN); Lianhai Wu, Beijing (CN); Haipeng Lei, Beijing (CN); Zhennian Sun, Beijing (CN); Zhi Yan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,346

(22) Filed: Jul. 18, 2022

(65) Prior Publication Data
US 2022/0353824 A1    Nov. 3, 2022

Related U.S. Application Data

(63) Continuation of application No. 17/280,014, filed as application No. PCT/CN2018/114791 on Nov. 9, 2018, now Pat. No. 11,445,446.

(51) Int. Cl.
*H04W 52/18* (2009.01)
*H04W 52/14* (2009.01)
(Continued)

(52) U.S. Cl.
CPC ......... *H04W 52/143* (2013.01); *H04L 5/0048* (2013.01); *H04W 52/362* (2013.01); *H04W 72/23* (2023.01)

(58) Field of Classification Search
CPC ............. H04W 52/143; H04W 52/362; H04W 72/1289; H04L 5/0048
See application file for complete search history.

(56) References Cited

U.S. PATENT DOCUMENTS 7,006,849 B2 *  2/2006  Li  ......................... H04B 7/0408
                                                              455/562.1
10,560,901 B2 *  2/2020  Jung  ................... H04W 52/346
(Continued)

FOREIGN PATENT DOCUMENTS

CN           1547332 A       11/2004
CN         105763300 A        7/2016
(Continued)

OTHER PUBLICATIONS

International Searching Authority, "Notification of Transmittal of the International Search Report and the Written Opinion of the International Searching Authority, or the Declaration", PCT/CN2018/114791, dated Nov. 9, 2018, pp. 1-7.
(Continued)

*Primary Examiner* — Hai V Nguyen
(74) *Attorney, Agent, or Firm* — Kanzler Bean & Adamson (57) ABSTRACT

Methods and apparatuses for power control are disclosed. A method comprises: receiving a first signaling indicating one or multiple power values for a downlink reception from a node, each power value being associated with a spatial domain filter, and determining a power value for the downlink reception from the node.

20 Claims, 5 Drawing Sheets

(51) Int. Cl.
*H04L 5/00* (2006.01)
*H04W 52/36* (2009.01)
*H04W 72/23* (2023.01)

(56) References Cited

U.S. PATENT DOCUMENTS

| | | | | |
|---|---|---|---|---|
| 10,856,320 | B2* | 12/2020 | Jung | H04L 5/0091 |
| 10,887,843 | B2* | 1/2021 | MolavianJazi | H04W 52/325 |
| 10,992,366 | B2* | 4/2021 | Jung | H04W 52/36 |
| 10,993,189 | B2* | 4/2021 | Jung | H04W 52/50 |
| 11,290,242 | B2* | 3/2022 | Jung | H04L 5/0091 |
| 11,445,446 | B2* | 9/2022 | Liu | H04W 52/362 |
| 2018/0302889 | A1 | 10/2018 | Guo et al. | |
| 2019/0261280 | A1* | 8/2019 | Jung | H04W 52/346 |
| 2019/0261281 | A1* | 8/2019 | Jung | H04W 52/50 |
| 2019/0313437 | A1* | 10/2019 | Jung | H04W 72/0453 |
| 2019/0349867 | A1* | 11/2019 | MolavianJazi | H04W 52/40 |
| 2020/0119799 | A1* | 4/2020 | Jung | H04W 52/36 |
| 2021/0068144 | A1* | 3/2021 | Jung | H04W 72/0453 |
| 2021/0105765 | A1* | 4/2021 | Cirik | H04B 7/0695 |
| 2021/0153137 | A1* | 5/2021 | MolavianJazi | H04W 52/325 |
| 2021/0211180 | A1* | 7/2021 | Jung | H04W 72/23 |
| 2021/0211988 | A1* | 7/2021 | Jung | H04W 52/386 |
| 2021/0258894 | A1* | 8/2021 | Yao | H04W 52/08 |
| 2021/0329563 | A1* | 10/2021 | Wu | H04L 5/0051 |
| 2021/0360701 | A1* | 11/2021 | Xu | H04L 5/0053 |
| 2022/0038921 | A1* | 2/2022 | Wu | H04L 1/1819 |
| 2022/0045806 | A1* | 2/2022 | Cirik | H04L 1/1887 |
| 2022/0046458 | A1* | 2/2022 | Zhu | H04W 72/046 |
| 2022/0094509 | A1* | 3/2022 | Jung | H04W 72/23 |

FOREIGN PATENT DOCUMENTS

| | | | |
|---|---|---|---|
| CN | 108134659 A | | 6/2018 |
| EP | 2849504 A1 | | 3/2015 |
| EP | 3668176 A1 | | 6/2020 |
| EP | 3806554 A1 * | 4/2021 | F24H 9/2035 |
| EP | 3806554 A1 | | 4/2021 |

OTHER PUBLICATIONS

3GPP, 3rd Generation Partnership Project; Technical Specification Group Radio Access Network; Discussion on physical layer enhancements for NR IAB, 3GPP R1-1812729, Nov. 2018, pp. 1-9.

3GPP, 3rd Generation Partnership Project; Technical Specification Group Radio Access Network; Discussion on physical layer enhancements for NR IAB, 3GPP R1-1811160, Oct. 2018, pp. 1-10.

Intel Corporation, PHY layer enhancements for NR IAB, 3GPP TSG RAN WG1 #94bis, R1-1810770, Oct. 8-12, Oct. 2018, pp. 1-13, Chengdu, China.

ZTE, Sanechips, Discussion on physical layer enhancements for NR IAB, 3GPP TSG RAN WG1 Meeting #95, R1-1812729, Nov. 12-16, 2018, pp. 1-9, Spokane, USA.

* cited by examiner

METHODS AND APPARATUSES FOR POWER CONTROL

CROSS REFERENCE TO RELATED APPLICATIONS

This application is a continuation of application Ser. No. 17/280,014 filed on Mar. 25, 2021, which is hereby incorporated by reference in its entirety.

FIELD

The subject matter disclosed herein generally relates to wireless communications and, more particularly, to methods and apparatuses for power control.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Sounding Reference Signal (SRS), Code division multiplexing (CDM), Physical Resource Block (PRB), Integrated Access and Backhaul (IAB), Time division multiplexing (TDM), Physical Downlink Shared Channel (PDSCH), Physical Uplink Shared Channel (PUSCH), Physical Downlink Control Channel (PDCCH), Physical Uplink Control Channel (PUCCH), Space Division Multiplexing (SDM), Frequency Division Multiplexing (FDM), reference signal (RS), Channel-state information reference signal (CSI-RS), synchronization signal block (SSB), Transmission Configuration Indication (TCI), Downlink Control Information (DCI), Radio Resource Control (RRC), Medium Access Control (MAC), Control Element (CE), logical channel identification (LCID), Transmission Configuration Indication (TCI), bandwidth part (BWP), subcarrier spacing (SCS), phase tracking reference signal (PTRS) and demodulation signal (DMRS).

Figure 1:
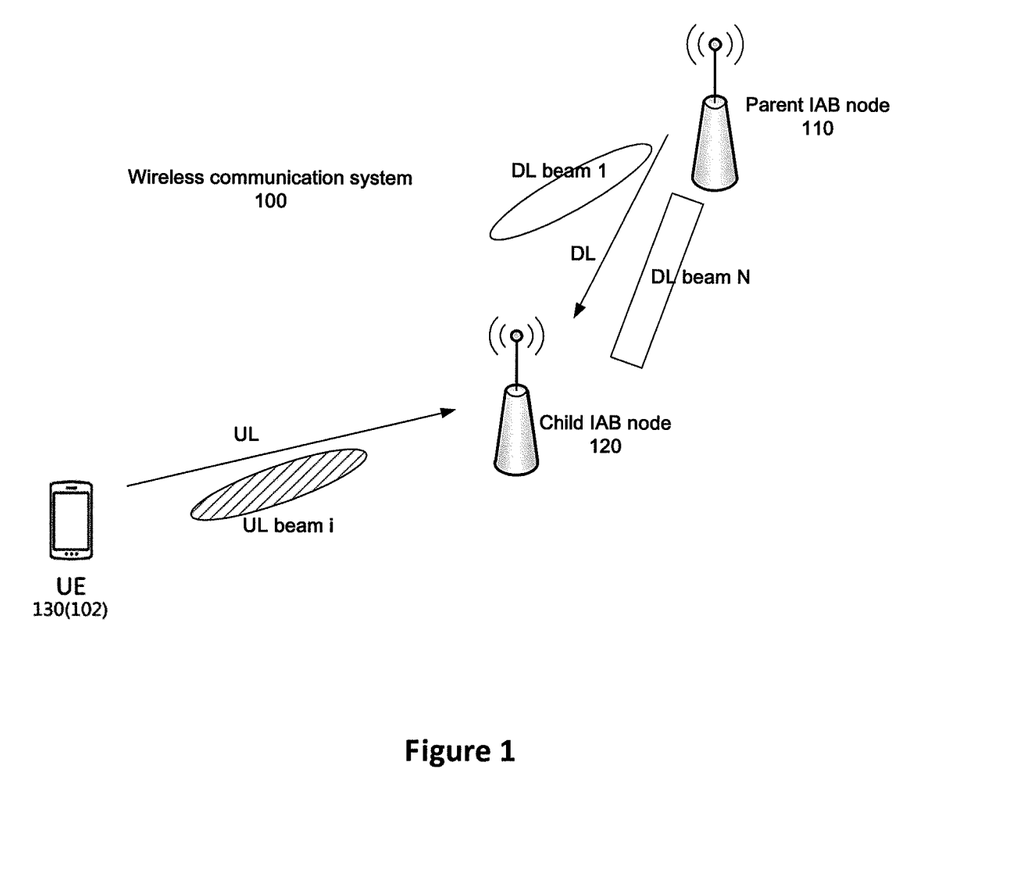
FIG. 1 is a schematic diagram illustrating one embodiment of an IAB system.

FIG. 1 shows a two-hop IAB (Integrated Access and Backhaul) system. FIG. 1 shows three types of nodes: parent IAB node 110, child IAB node 120 and UE 130. The link between the parent IAB node 110 and the child IAB node 120 is referred to as parent backhaul link. The link between the child IAB node 120 and its served UE 130 is referred to as access link. Technically, the UE 130 shown in FIG. 1 may also be a child IAB node that serves another UE.

An IAB node is a kind of gNB which can perform both gNB and UE function. When it is started, it will behave like a UE to do cell search and find suitable cell to associate with. After it is connected to the network, it can behave like a gNB to serve UEs by transmitting system broadcast information and scheduling UEs. Both the parent IAB node and the child IAB node in FIG. 1 can be considered as an IAB node.

In the IAB system shown in FIG. 1, when Space Division Multiplexing (SDM) or Frequency Division Multiplexing (FDM) is adopted between the parent backhaul link and the access link, power imbalance will happen due to different capabilities of the IAB node(s) and the UE. In case of SDM, the downlink (DL) signal that the child IAB node 120 receives from the parent IAB node 110 and the uplink (UL) signal that the child IAB node 120 receives from the UE 130 are multiplexed by different spatial layers. To enable efficient spatial domain multiplexing, it is preferable that the power level of the downlink signal and the power level of the uplink signal are comparable (at approximately the same level). In case of SDM, the downlink (DL) signal that the child IAB node 120 receives from the parent IAB node 110 and the uplink (UL) signal that the child IAB node 120 receives from the UE 130 are multiplexed by different frequency domain resources while sharing a same power amplifier. To enable efficient frequency domain multiplexing, it is preferable that the power level of the downlink signal and the power level of the uplink signal are comparable.

In a Multiple-Input Multiple-Output (MIMO) scenario especially in high frequency band, a plurality of beams can be used to transmit signals between the parent IAB node 110 and the child IAB node 120, and between the child IAB node 120 and the UE 130. FIG. 1 shows that one beam, i.e., UL beam i, is used to transmit UL signals from the UE 130 to the child IAB node 120. In addition, FIG. 1 shows that two beams, i.e., DL beam 1 and DL beam N, can be used to transmit DL signals from the parent IAB node 110 to the child IAB node 120, in which the DL beam 1 may be the preferred beam selected by the child IAB node 120. The beam is generated by weighting values in the multiple antenna elements. Different beams correspond to different strongest transmission or reception directions. For a specific beam, there will be different channel gain values at different directions. At any of the parent IAB node 110, the child IAB node 120 and the UE 130, each beam corresponds to a spatial domain filter.

As an example, the power level of the received downlink signal using DL beam 1 ranges from −144 dBm to −44 dBm, while the power level of the received uplink signal using UL beam i ranges from −202 dBm to −60 dBm. In this condition, the maximum received power level that the child IAB node 120 can configure for the uplink signal using UL beam i is −60 dBm. If the received power level of the downlink signal using DL beam 1 is more than −60 dBm, for example, −50 dBm, it is impossible for the child IAB node 120 to configure the received power level of the uplink signal using UL beam i to a level that is comparable to (i.e. approximately the same as) the received power level of the downlink signal using DL beam 1. The difference between of the maximum received power level of the downlink signal using DL beam 1 and the maximum received power level of the uplink signal using UL beam i may be referred to as "power gap" (see FIG. 2).

Figure 2:
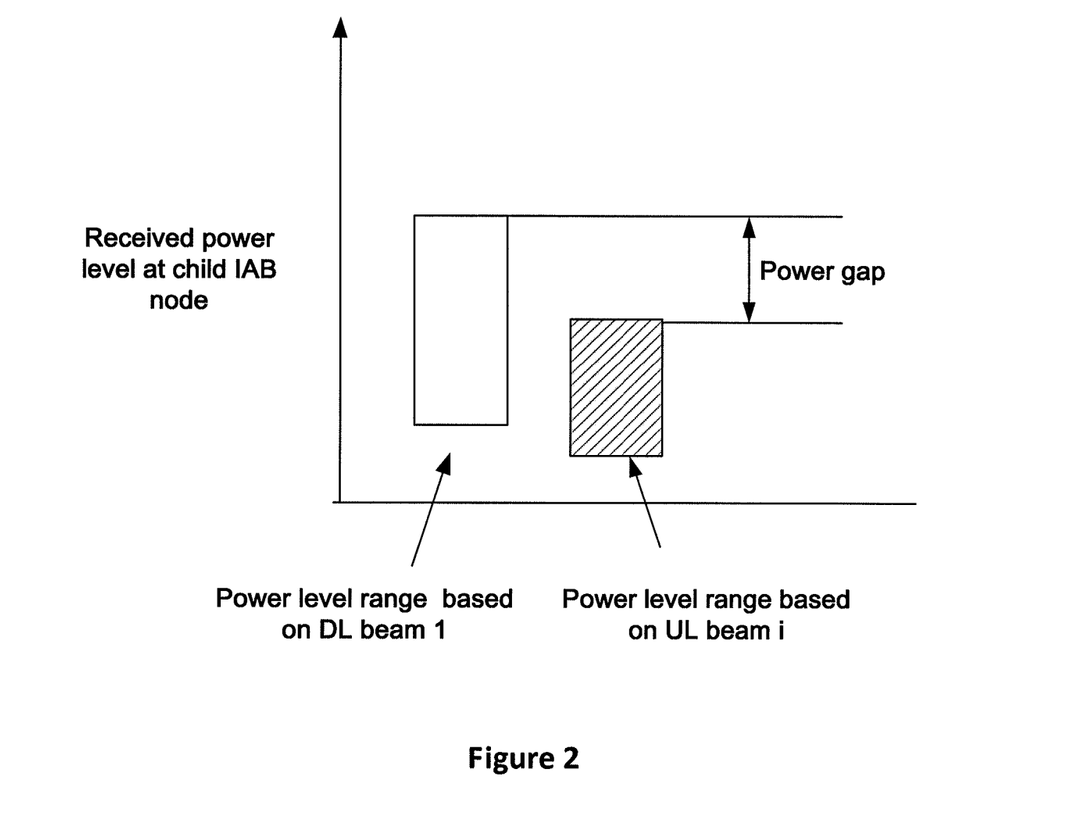
FIG. 2 is a schematic diagram illustrating a power gap.

FIG. 2 shows the power gap between the maximum received power level of the downlink signal based on DL beam 1 and the maximum received power level of the uplink signal based on UL beam i. Both the maximum power levels refer to the receiving power at the child IAB node 120. Because of the power gap, the child IAB node 120 may not be able to configure the power level of uplink signal from the UE 130 to the child IAB node 120 using UL beam i to a level that is approximately the same as the power level of the downlink signal from the parent IAB node 110 to the child IAB node 120 using DL beam 1 if the power level of the downlink signal using DL beam 1 is configured to be more than the maximum power level of the uplink signal using UL beam i.

BRIEF SUMMARY

Methods and apparatuses for power control are disclosed.

In one embodiment, a method comprises: receiving a first signaling indicating one or multiple power values for a downlink reception from a node, each power value being associated with a spatial domain filter, and determining a power value for the downlink reception from the node.

In some embodiment, the power value is a power offset that indicates that a power level to be reduced, or an absolute transmitting power level, or an absolute receiving power level. In other embodiment, the power values associated with one or multiple spatial domain filters are configured by RRC signaling or by MAC CE signaling, or any combination thereof. In particular, the power value for PDSCH scheduled by a DCI is determined by a TCI state in the DCI or a default TCI state or a default TCI state set, and the TCI state is used to determine the spatial domain filter.

In some embodiment, both the default TCI state and the default TCI state set are selected from a TCI state set configured by RRC signaling or MAC CE signaling or DCI 2_0 or DCI 2_2 or DCI 2_3 or any combination thereof. In other embodiment, the power value for PDSCH is based on the smallest or the largest value among power values for all the TCI states in the default TCI state set.

In some embodiment, he power value for PDCCH or for CSI-RS is determined by a TCI state in RRC signaling or MAC CE signaling or any combination thereof.

In some embodiment, both the power value and the TCI state corresponding to the spatial domain filter are indicated in DCI to determine the power value for scheduled PDSCH. Moreover, the number of bits for power value indication in the DCI is configured by RRC signaling.

In some embodiment, an apparatus comprises: a receiver that receives first signaling indicating one or multiple power values for a downlink reception from a node, each power value being associated with a spatial domain filter, and a processor that determines a power value for the downlink reception from the node.

In some embodiment, a method comprises: transmitting a first signaling indicating one or multiple power values for a downlink reception from a node, each power value being associated with a spatial domain filter. In other embodiment, an apparatus comprises: a transmitter that transmits a first signaling indicating one or multiple power values for a downlink reception from a node, each power value being associated with a spatial domain filter.

In some embodiment, a method comprises: receiving a first signaling indicating a set of RS resources, wherein each RS resource corresponds to a spatial domain filter; receiving a second signaling indicating reporting for power values for all of or part of RS resources contained in the set of RS resources; and reporting power value for at least one of the RS resources. In other embodiment, an apparatus comprises: a receiver that receives a first signaling indicating a set of RS resources, wherein each RS resource corresponds to a spatial domain filter, and receives a second signaling indicating reporting for power values for all of or part of RS resources contained in the set of RS resources; and a transmitter that reports power value for at least one of the RS resources.

In some embodiment, a method comprises: transmitting a first signaling indicating a set of RS resources, wherein each RS resource corresponds to a spatial domain filter; transmitting a second signaling indicating reporting for power values for all of or part of RS resources contained in the set of RS resources; and receiving power value for at least one of the RS resources. In other embodiment, an apparatus comprises: a transmitter that transmits a first signaling indicating a set of RS resources, wherein each RS resource corresponds to a spatial domain filter, and transmits a second signaling indicating reporting for power values for all of or part of RS resources contained in the set of RS resources; and a receiver that receives power value for at least one of the RS resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions or acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function or act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions or acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for power control. In one embodiment, the wireless communication system 100 includes parent IAB nodes 110, child IAB nodes 120 and UEs 130. Even though only one parent IAB node 110, one child IAB node 120 and one UE 130 are depicted in FIG. 1, one skilled in the art will recognize that any number of parent IAB nodes 110, child IAB nodes 120 and UEs 130 may be included in the wireless communication system 100.

In the parent backhaul link between the parent IAB node 110 and the child IAB node 120, the parent IAB node functions as a base unit 104 while the child IAB node functions as a remote unit 102. In the access link between the child IAB node 120 and the UE 130, the child IAB node functions as a base unit 104 while the UE functions as a remote unit 102. For any link between a base unit 104 and a remote unit 102, the base unit 104 would be responsible to control the communication between the base unit 104 and the remote unit 102.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area. The base units 104 transmit DL communication signals to serve the remote units 102 in the time, frequency, and/or spatial domain.

Figure 3:
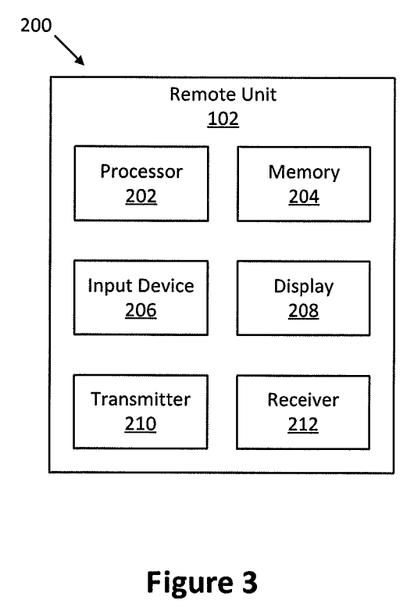
FIG. 3 is a schematic block diagram illustrating one embodiment of an apparatus that may be used for power control.

FIG. 3 depicts one embodiment of an apparatus 200 that may be used for power control. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 4:
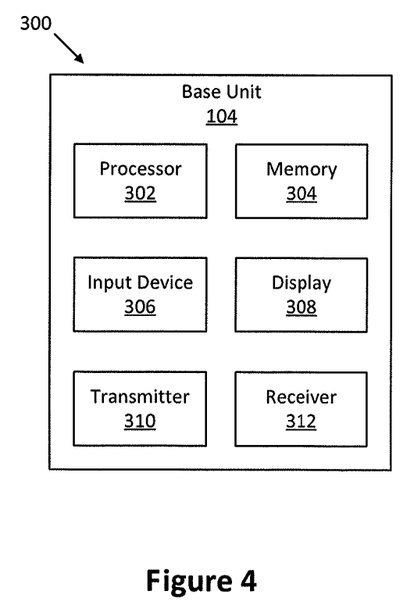
FIG. 4 is a schematic block diagram illustrating one embodiment of another apparatus that may be used for power control.

FIG. 4 depicts one embodiment of another apparatus 300 that may be used for power control. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 5:
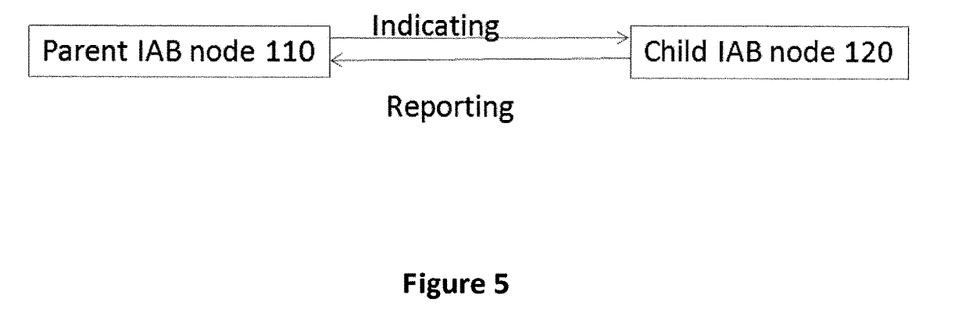
FIG. 5 is a schematic diagram illustrating a principle of power control according to a first embodiment.

FIG. 5 is a schematic diagram illustrating a principle of power control according to the first embodiment. FIG. 5 shows that the parent IAB node 110 indicates power value(s) to the child IAB node 120. FIG. 5 also shows that the child IAB node 120 reports power value(s) to the parent IAB node 110.

If the downlink power level of a DL beam from the parent IAB node 110 to the child IAB node 120 is larger than the maximum power level of the power range of the uplink signal of a UL beam from the UE to the child IAB node 120, the child IAB node 120 can only configure the uplink power level to its maximum power level, which is still lower than the downlink power level. The difference of the maximum uplink power level from the downlink power level may be called as "power offset".

The power offset may be different from the above-identified power gap. For example, suppose that the range of downlink power level using DL beam 1 is from −140 dBm to −44 dBm while the range of uplink power level using UL beam i is from −202 dBm to −60 dBm, the power gap refers to the difference between the maximum downlink power level (−44 dBm) and the maximum uplink power level (−60 dBm). On the other hand, the power offset is the power level that the child IAB node 120 expects to reduce from the downlink power level of the DL beam. For example, if the downlink power level of a beam (such as the DL beam 1 shown in FIG. 1) is −50 dBm, and the child IAB node 120 expects to configure the uplink power level using UL beam i to be −80 dBm, the child IAB node 120 therefore expects that the downlink power level of the beam (the DL beam 1) to be reduced by 30 dBm (−50 dBm−(−80 dBm)). In this condition, the child IAB node 120 may reports to the parent IAB node 110 that the power level of the beam (the DL beam 1) is expected to reduce a power offset of 30 dBm.

In the above example, the child IAB node 120 expects to configure the uplink power level to be a power level (−80 dBm) lower than its maximum power level (−60 dBm). This is in consideration of other factors such as UE power saving, or reducing interference produced by UE's uplink transmission to other possible receivers.

In this condition, the child IAB node 120 reports a power offset of 30 dBm for the downlink beam (DL beam 1 shown in FIG. 1). The power offset is reported by the child IAB node 120 to the parent IAB node 110 on a per-beam basis. Different beams may have different power levels, which may be resulted from different path losses for different beams. For example, with reference to FIG. 1, suppose the power level of DL beam N at the child IAB node 120 is −48 dBm, the power offset for the DL beam N to be reported by the child IAB node 120 would be 32 dBm (−48 dBm−(−80 dBm)). And if the received power level of DL beam 1 at child IAB node 120 is −30 dBm, then the power offset for the DL beam 1 to be reported by the child IAB node 120 would be 50 dBm (−30 dBm−(−80 dBm)).

All of the above-described power levels refer to the power levels measured at the child IAB node 120. The power level would experience a path loss when it is transmitted to the child IAB node 120. For example, taking into consideration of an average path loss of 85 dBm, the uplink received power level range of −202 dBm to −60 dBm at the child IAB node 120 would correspond to −117 dBm (−202 dBm+85 dBm) to 25 dBm (−60 dBm+85 dBm) at the transmitter side (at the UE). The downlink received power level range of −140 dBm to −44 dBm at the child IAB node 120 would correspond to −55 dBm (−140 dBm+85 dBm) to 41 dBm (−44 dBm+85 dBm) at the transmitter side (at the parent IAB node).

When the parent IAB node 110 receives an expected power offset for a specific beam from the child IAB node 120, the parent IAB node 110 may indicate to the child IAB node 120 the new power level for any specific beam. The new power level for the specific beam may be calculated based on the received power offset. For example, suppose that the previous received power level of the specific beam (DL beam 1) is −50 dBm and that the received expected power offset for the specific beam (DL beam 1) is 30 dBm (that is the power level to be reduced), the parent IAB node 110 may configure the new power level for the specific beam (DL beam 1) to −80 dBm (−50 dBm−30 dBm) and indicate the new power level for the specific beam to the child IAB node 120. Since a beam corresponds to a spatial domain filter, the new power level is also associated with the spatial domain filter. The parent IAB node 110 can also indicate to the child node 120 that the power offset will be reduced by 30 dBm. Alternatively, the parent IAB node 110 may choose to indicate another new power level for the specific beam to the child IAB node 120, instead of only being based on the received power offset. For example, the indicated received power level is −70 dBm or the power offset indicated is 20 dBm. The reason for a different power offset from the reported power offset is that the parent IAB node may serve multiple UEs or child IAB nodes. For efficient multiplexing of the multiple UEs or child IAB nodes, the downlink transmission power should consider all the other multiplexed UEs or child IAB nodes.

As the parent IAB node 110 may indicate the new power level for the specific beam (i.e. specific spatial domain filter) to the child IAB node 120 without considering the reported power offset from the child IAB node 120, the report of the power offset from the child IAB node 120 is independent from the indication of new power level by the parent IAB node 110. In the condition that the parent IAB node 110 indicates the new power level to the child JAB node 120 without consideration of the report of the power offset from the child IAB node 120, it is referred to as an open loop DL power control. On the other hand, in the condition that the parent IAB node 110 considers the report of the power offset when it indicates the new power level to the child IAB node 120, it is referred to as a close loop DL power control. The report of the expected power offset by the child IAB node 120 may be implemented independently from the indication of the new power level.

Figure 6:
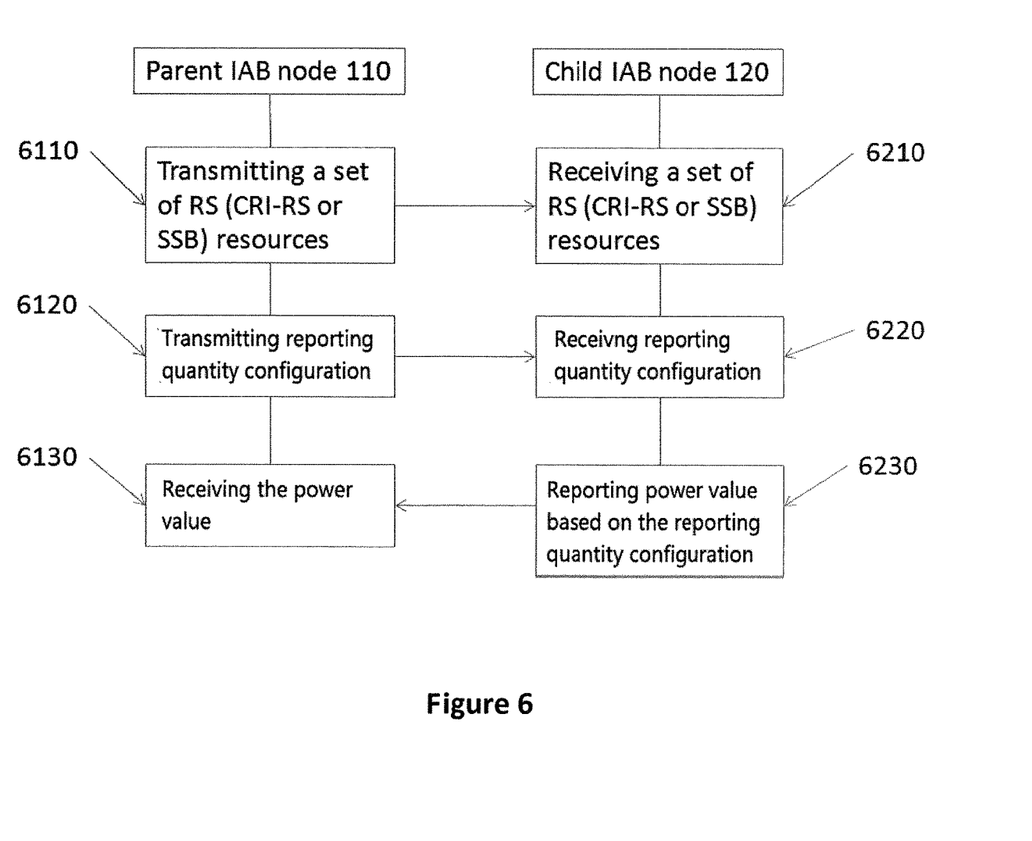
FIG. 6 is a flow chart diagram illustrating a method according to a second embodiment.

FIG. 6 illustrates the schematic diagram of the method performed in the parent IAB node 110 and in the child IAB node 120 according to the second embodiment, in which the child IAB node 120 reports the power value to the parent IAB node 110.

In step 6110, the parent IAB node 110 transmits a set of reference signal (RS) resources to the child IAB node 120. The RS resource may be Channel-state information reference signal (CSI-RS) resource and/or synchronization signal block (SSB) resource. In step 6210, the child IAB node 120 receives the set of reference signal (RS) resources. Each RS resource is associated with a beam, and therefore associated with a spatial domain filter. Different RS resources may be transmitted using different beams (different spatial domain filters). Incidentally, different RS resources may also be transmitted using the same beam (the same spatial domain filter). For example, a CSI-RS resource and a SSB resource may be transmitted using the same beam (the same spatial domain filter). As a whole, each RS resource is transmitted from the parent IAB node 110 to the child IAB node 120 using a specific beam (a specific spatial domain filter).

In step 6120, the parent IAB node 110 transmits a reporting quantity configuration to the child IAB node 120. The reporting quantity configuration may include power levels for one or multiple RS resources in the set of RS resources. Since each RS resource is associated with a beam (spatial domain filter), the reporting quantity configuration actually includes power levels for the beam(s) (spatial domain filter(s)) associated with the one or multiple RS resources. Alternatively, the reporting quantity configuration may include both power levels and the resource indices of the power levels, wherein the resource indices are also associated with corresponding beams (spatial domain filters). The power levels may be the absolute power levels transmitted at the parent IAB node 110, or the absolute power levels received at the child IAB node 120, or the power offset compared to the previous power levels. The difference between the received power level and the transmitted power level is the path loss.

In step 6230, the child IAB node 120 reports power values for one or multiples beams (spatial domain filters) to the parent IAB node 110. And in step 6130, the parent IAB node 110 receives the power values for the one or multiple beams (spatial domain filters).

In step 6210, the child IAB node 120 receives a set of RS resources (which represent a set of beams used for transmitting), which are used to determine the power offset for each corresponding beam. In step 6220, the child IAB node 120 receives the reporting quantity configurations, which can be the power value for one or multiple beams of the set of RS resources in step 6110. The power value can be the power levels transmitted at the parent IAB node 110 or the power levels received at the child IAB node 120. For example, one RS resource is transmitted using DL beam 1 shown in FIG. 1 and its power level received at the child IAB node 120 is −50 dBm, and another RS resource is transmitted using DL beam N shown in FIG. 1 and its power level received at the child IAB node 120 is −48 dBm. Meanwhile, if the uplink power level received at the child IAB node 120 is −80 dBm, then the power offset for DL beam 1 is 30 dBm, and the power offset for DL beam N is 32 dBm. Accordingly, in step 6210, the child IAB node 120 receives a set of RS resources including two RS resources (one of which is associated with DL beam 1 and another of which is associated with DL beam N). In step 6220, the child IAB node 120 receives the reporting quantity configuration. The reporting quantity configuration can be for all the resources (beams) or for one or multiplex best resources (beams).

In step 6230, the child IAB node 120 reports power values for the received RS resources. If the reporting quantity configuration is for all the resources (beams), then both power offset 30 dBm and 32 dBm will be reported simultaneously, wherein 30 dBm is for DL beam 1, and 32 dBm is for DL beam N. If the reporting quantity configuration is for one best resource (beam), then the reported information may be both 30 dBm and DL beam 1 to indicate that DL beam 1 is the best beam and its corresponding power offset is 30 dBm. DL beam 1 can be indicated by resource index 0. If the best beam determined by the child IAB node 120 is DL beam N, then the reported information will be both 32 dBm and DL beam N. DL beam N can be indicated by resource index 1.

There are various factors to be considered for the report.

(1) The report may include power offset(s) for the received RS resources, i.e. the power level to be reduced. Alternatively, the report may include expected absolute received power levels for the received RS resources. For example, for the RS resource (associated with DL beam 1) with the power level of −50 dBm, if the expected power level is −80 dBm, the child IAB node 120 may report a power offset of 30 dBm, or an absolute power level of −80 dBm. For ease of discussion, the following discussion is made on the assumption that the reporting power values are power offsets.

(2) The child IAB node 120 may report power offsets for all of the received RS resources or for only a part of the received RS resources based on the reporting quantity configuration. For example, if the reporting quantity configuration is the preferred beam and corresponding power offset, and the child IAB node 120 chooses to receive signals only from the DL beam 1 but does not receive signals from the DL beam N, the child IAB node 120 may report the power offset for the RS resource associated with the DL beam 1, but does not report the power offset for the RS resource associated with the DL beam N. The report format for the report may be: index a-power_offset 1, index b-power offset 2, . . . . The index a or b indicates the indices of the RS resources to be reported. For example, if four RS resources are included in the set with indices 0-3 while the child IAB node 120 chooses to only report the power offsets for the RS resources with indices 1 and 3, then the report format will be 1-power_offset 1, 3-power offset 2. If the reporting quantity configuration is to report power offsets for all the resources, then the report format may be: power_offset 1, power_offset 2, . . . , wherein power_offset 1 is for the first resource (beam) in the resource set, and power_offset 2 is for the second resource (beam) in the resource set, etc.

(3) In reporting the power offset, a differential reporting manner may be adopted. For example, suppose four power offsets are to be reported with values of 30 dBm, 40 dBm, 60 dBm and 30 dBm, the differential reporting will include 30 dBm (which equals to the first power offset), 10 dBm (which equals to the second power offset 40 dBm minus the first power offset 30 dBm), 20 dBm (which equals to the third power offset 60 dBm minus the second power offset 40 dBm) and −30 dBm (which equals to the fourth power offset 30 dBm minus the third power offset 60 dBm).

(4) The RS resources may be CSI-RS resources and/or SSB resources. As described above, different CSI-RS resources may be associated with different beams. Similarly, different SSB resources may also be associated with different beams. For example, a CSI-RS resource and a SSB resource may be associated with the same beam. For the CSI-RS resource and the SSB resource that are associated with the same beam, if the power offset between CSI-RS resource and SSB resource is known, then an average received power level can be calculated based on both the CSI-RS received power level and SSB received power level. For example, if the power offset between CSI-RS and SSB is 3 dBm (transmission power for the CSI-RS resource at the parent IAB node 110 is 35 dBm, and transmission power for the SSB resource at the parent IAB node 110 is 38 dBm), and if the received power level for the CSI-RS resource at the child IAB node 120 is −50 dBm, and the received power level for the SSB resource at the child IAB node 120 is −45 dBm, then the average received power level for the beam corresponding to the CSI-RS resource and SSB resource can be calculated as "½(−50+(−45−(38−35)))=−49 dBm". That is to say, the average value of the power levels at the receiving terminal (the child IAB node 120) is calculated in view of the different transmitting power levels at the transmitting terminal (the parent IAB node 110).

Figure 7:
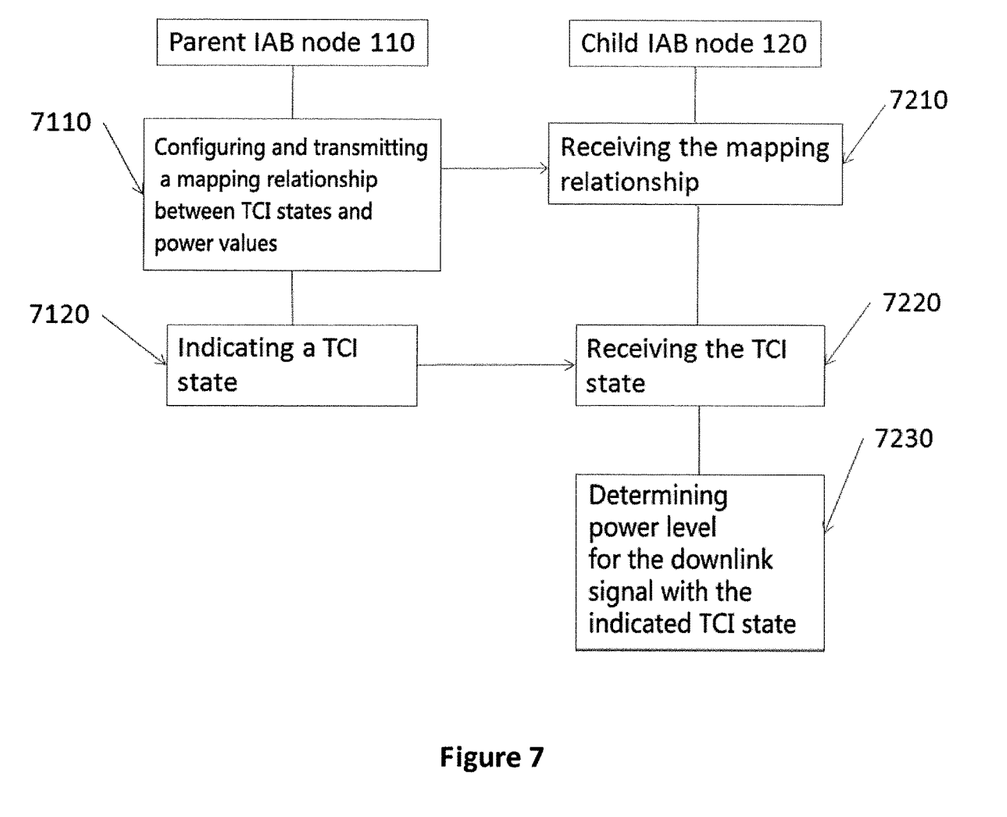
FIG. 7 is a flow chart diagram illustrating a method according to a third embodiment.

FIG. 7 illustrates the schematic diagram of the method performed in the parent IAB node 110 and in the child IAB node 120 according to the third embodiment.

In step 7110, the parent IAB node 110 configures a mapping relation between Transmission Configuration Indication (TCI) states and power values and transmits the mapping relation to the child IAB node 120. A TCI state is related to a CSI-RS or SSB resource, and it corresponds to a spatial beam and also corresponds to a spatial domain filter. In step 7210, the child IAB node 120 receives the mapping relation.

In one embodiment, a TCI state set and a power value set are respectively configured. A TCI state is mapped to a power value with the same index. Each TCI state is associated with a beam and therefore associated with a spatial domain filter. Therefore, a mapping relation between the TCI state and the power value creates a look-up table for the power value of each beam (spatial domain filter).

For example, the mapping relation may be as follows:

| TCI state | Power value |
|---|---|
| 1 (corresponding to beam 1) | Power value 1 |
| 2 (corresponding to beam 2) | Power value 2 |
| 3 (corresponding to beam 3) | Power value 3 |
| 4 (corresponding to beam 4) | Power value 4 |
| . . . | . . . |

The power value may be a power offset that indicates that the power level to be reduced, or an absolute power level used for the corresponding beam. The absolute power level may be the power level transmitted at the parent IAB node 110 or the power level received at the child IAB node 120.

In step 7120, the parent IAB node 110 indicates a TCI state to the child IAB node 120. In step 7220, the child IAB node 120 receives the indicated TCI state.

The child IAB node 120 receives the indicated TCI state, and checks the mapping relation between the TCI state and the power value, and learns the power value for the beam (spatial domain filter) corresponding to the indicated TCI state.

In step 7230, the child IAB node 120 determines the power level for the downlink signal received from the parent node 110 with the indicated or determined TCI state. Accordingly, based on the power level for the downlink signal, the child IAB node 120 can configure the power level for the uplink signal to a level that is approximately the same as the power level of the downlink signal.

There are a variety of options to configure the mapping relation between TCI states and power values and indicate the TCI state.

(1) Option 1: the mapping relation between TCI states and power values is configured by RRC signaling.

In the condition that the mapping is configured by RRC signaling, there are several ways to indicate the TCI state. The TCI state may be indicated differently for different channels such as Physical Downlink Shared Channel (PDSCH), Physical Downlink Control Channel (PDCCH) and CSI-RS for CSI measurement.

(1-1) When DCI (Downlink Control Information) 1_1 is used for scheduling PDSCH, the TCI state contained in the DCI 1_1 can be used as the indicated TCI state.

(1-2) When DCI 1_0 is used for scheduling PDSCH, the default TCI state for the DCI 1_0 can be used as the indicated TCI state.

(1-3) For PDCCH, a TCI state that is configured by RRC and MAC CE can be used. In this case, RRC signaling configures a set of TCI states, and MAC CE signaling selects one TCI state from the set of TCI states as the indicated TCI state.

(1-4) For periodic CSI-RS used for CSI measurement, a TCI state in the CSI-RS resource configuration can be used as the indicated TCI state.

(2) Option 2: the mapping relation between TCI state and power value is configured by MAC CE signaling.

Each MAC CE signaling has a logical channel identification (LCID). A new LCID is introduced to indicate that a specific MAC CE signaling with the new LCID is used for configuring the mapping relation between TCI states and power values.

In the condition that the mapping is configured by MAC CE signaling (i.e. Option 2), all of the above-described (1-1)-(1-4) can be used to indicate the TCI state.

(3) Option 3: DCI 2_0 or DCI 2_2 or DCI 2_3 is used to indicate the power value of each TCI state. In this case, a first RRC signaling is used to configure a TCI state set, and the format in DCI 2_0 or DCI 2_2 or DCI 2_3 will be: power value 1, power value 2, etc. A second RRC signaling is used to configure the starting position in DCI 2_0 (or DCI 2_2 or DCI 2_3) for each TCI state in the TCI state set. For example, for TCI state 0, if the configured starting position is 8 (suppose each power value occupies 8 bits, and the power value 1 is the first part in DCI 2_0 or DCI 2_2 or DCI 2_3), then it means that the power value for TCI state 0 is power value 2; and if the configured starting position for TCI state 2 is 0, then the power value for TCI state 2 is power value 1 in DCI 2_0 or DCI 2_2 or DCI 2_3.

In the condition that the mapping is configured by RRC signaling and DCI 2_0 (or DCI 2_2 or DCI 2_3) (i.e. Option 3), all of the above-described (1-1)-(1-4) can be used to indicate the TCI state.

In the condition that the mapping is configured using DCI 2_0 or DCI 2_2 or DCI 2_3, the applicable range of the power value in time domain is from the reception of the DCI 2_0 or DCI 2_2 or DCI 2_3 to the reception of a new DCI 2_0 or DCI 2_2 or DCI 2_3.

(4) Option 4: When DCI 1_1 is used to schedule PDSCH, both a TCI state and a power value indication are contained in the DCI 1_1. It means that the corresponding PDSCH is transmitted with the indicated TCI state, and the received power level of the PDCSH at the child IAB node can be determined based on the indicated power value. In one embodiment, the power value indication can be a power offset to reduce the power level, or an absolute transmission power level at the parent IAB node side or a reception power level at the child IAB node side. In another embodiment, multiple power values can be configured by RRC signaling, and DCI 1_1 selects one of them. The multiple power values can be multiple power offsets, multiple transmission power levels or multiple reception power levels. For example, RRC signaling configures 4 possible power offsets: 0 dBm, 10 dBm, 20 dBm, and 30 dBm. If the power value indication in DCI 1_1 is 0, it means that the power offset is 0 dBm, and if the power value indication in DCI 1_1 is 2, then the power offset is 20 dBm. The RRC signaling also configures the number of bits used for a power value indication. For example, if only 4 power offsets are configured, 2 bits are enough for indicate four values.

In the above-described Options 1-4, in case of SDM or FDM between the backhaul link and the access link, if the indication of the TCI state from the parent IAB node 110 is made by DCI 1_1, the corresponding scheduled PDSCH will have 0 or 1 slot delay from DCI 1_1. On the other hand, when the child IAB node 120 schedules PUSCH by PDCCH, the delay between PDCCH and PUSCH is about 4 slots. That is to say, if the PDSCH and the PUSCH is at the same time domain resource, then the PDCCH scheduling PUSCH should be before the PDCCH scheduling PDSCH. So the control information in PDCCH scheduling PUSCH can't be determined based on the PDCCH scheduling PDSCH. In this condition, the child IAB node 120 determines the power control for the uplink signal from the access UE based on a default TCI state. The default TCI state may be the TCI state with index 0 in a predetermined TCI state set. In this case, the power value corresponding to the TCI state with index 0 in the predetermined TCI state set is assumed as the downlink reception power at the child IAB node from the parent IAB node, and the uplink reception power at the child IAB node from the access UE can be determined approximately same as the downlink reception power. Alternatively, the child IAB node 120 may determine the power control for the uplink signal from the access UE based on a default TCI state set. In particular, the smallest or the largest value among power values for all the TCI states in the default TCI state set may be assumed as the downlink reception power at the child IAB node from the parent IAB node. The TCI states contained in both the predetermined TCI state set and the default TCI state set may be selected from all or part of the TCI state values configured by RRC signaling or all or part of the TCI states indicated in MAC CE signaling or DCI 2_0 (or DCI 2_2 or DCI 2_3).

In the above-described Options 1-4, in case of FDM between the backhaul link and the access link, different frequency domain resources are used for the transmission from the parent IAB node to the child IAB node and the transmission from the UE to the child IAB node. If the PDCCH scheduling PUSCH is before the PDCCH scheduling PDSCH, the frequency domain resource allocation information in PDCCH scheduling PUSCH can't be determined based on the frequency domain resource allocation information in PDCCH scheduling PDSCH. In this condition, the frequency domain resource allocation in PDCCH scheduling PUSCH can be determined based on a semi-static configuration of the PDSCH. For example, a BWP (bandwidth part) is always configured for the PDSCH transmission from parent IAB node to child IAB node, and a set of frequency domain resources indicated in the BWP configuration may be used by the PDSCH transmission. So the PDCCH scheduling PUSCH can determine the frequency domain resource allocation by avoiding all the frequency domain resources corresponding to the bandwidth part.

The purpose for power or TCI indication or BWP indication in the parent link is for SDM or FDM multiplexing between the parent backhaul link and the child backhaul/access link. A relationship between the power or TCI or BWP (set) and slot format indication can be established by RRC signaling or predefined. For example, two power values can be configured by RRC signaling as: power value 1, power value 2. And power value 1 is assumed when TDM is adopted, and power value 2 is assumed when FDM or SDM is adopted. If the slot format indicates that FDM or SDM between parent backhaul link and access link is enabled, then the received power level is determined to be power value 2 implicitly. So in this case, there is no additional signaling for power value indication. Similar implicit signaling can also be applied to TCI indication or BWP indication.

In another embodiment, when the subcarrier spacings (SCSs) for parent backhaul link and for access link are different, a common resource grid (SCS) should be determined to obtain a suitable resource for FDM between two links. For example, if the backhaul link SCS is 60 kHz, and the SCS for access link is 15 kHz, then the common grid can be based on 15 kHz. In this case, a subcarrier with 60 kHz corresponds to 4 subcarriers. If the subcarrier index for the backhaul link with 60 kHz ranges from 10 to 20, when it transfers to 15 kHz, the index will be from 10 to 80, with index 10 divided into indices 10, 11, 12, 13, and index 11 divided into indices 14, 15, 16, 17, etc.

The power value for PDSCH has been described above. The scheduled PDSCH time and frequency range also applies to PTRS (phase tracking reference signal) and DMRS (demodulation signal) within the scheduled PDSCH time and frequency range.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transmitter to transmit a first signaling indicating at least one power value for a downlink reception from a node, wherein each power value of the at least one power value is associated with a spatial domain filter.

2. The apparatus of claim 1, wherein each power value of the at least one power value is a power offset that indicates a power level to be reduced, an absolute transmitting power level, or an absolute receiving power level.

3. The apparatus of claim 1, wherein each power value of the at least one power value is associated with at least one spatial domain filter configured by radio resource control (RRC) signaling, medium access control (MAC) control element (CE) signaling, or a combination thereof.

4. The apparatus of claim 1, wherein each power value of the at least one power value is associated with at least one spatial domain filter indicated by downlink control information (DCI) format 2_0, DCI format 2_2, or DCI format 2_3, and a starting position of each power value for a specific spatial domain filter in DCI format 2_0, DCI format 2_2, or DCI format 2_3 is configured by RRC signaling.

5. The apparatus of claim 4, wherein each power value of the at least one power value for a physical downlink scheduled channel (PDSCH) communication scheduled by DCI is determined by a transmission configuration indicator (TCI) state in the DCI, a default TCI state, or a default TCI state set, and the TCI state is used to determine the specific spatial domain filter.

6. The apparatus of claim 5, wherein the default TCI state and the default TCI state set are selected from a TCI state set configured by RRC signaling, MAC CE signaling, DCI format 2_0, DCI 2_2 format, DCI format 2_3, or some combination thereof.

7. The apparatus of claim 5, wherein each power value of the at least one power value for the PDSCH is based on a smallest value or a largest value among power values for all TCI states in the default TCI state set.

8. The apparatus of claim 4, wherein each power value of the at least one power value for a physical downlink control channel (PDCCH) communication or for a channel state information reference signal (CSI-RS) is determined by a TCI state in RRC signaling, MAC CE signaling, or a combination thereof.

9. The apparatus of claim 1, wherein one power value of the at least one power value and a TCI state corresponding to the spatial domain filter are indicated in DCI to determine a power value for a scheduled PDSCH.

10. The apparatus of claim 9, wherein a number of bits for power value indication in the DCI is configured by RRC signaling.

11. A method at a network device, the method comprising:
transmitting a first signaling indicating at least one power value for a downlink reception from a node, wherein each power value of the at least one power value is associated with a spatial domain filter.

12. The method of claim 11, wherein each power value of the at least one power value is a power offset that indicates a power level to be reduced, an absolute transmitting power level, or an absolute receiving power level.

13. The method of claim 11, wherein each power value of the at least one power value is associated with at least one spatial domain filter configured by radio resource control (RRC) signaling, medium access control (MAC) control element (CE) signaling, or a combination thereof.

14. The method of claim 11, wherein each power value of the at least one power value is associated with at least one spatial domain filter indicated by downlink control information (DCI) format 2_0, DCI format 2_2, or DCI format 2_3, and a starting position of each power value for a specific spatial domain filter in DCI format 2_0, DCI format 2_2, or DCI format 2_3 is configured by RRC signaling.

15. An apparatus comprising:
a transmitter to:
transmit first signaling indicating a set of reference signal (RS) resources, wherein each RS resource of the set of RS resources corresponds to a spatial domain filter; and
transmit second signaling indicating reporting for power values for all or part of RS resources contained in the set of RS resources; and
a receiver that receives a power value for an RS resource of the set of RS resources.

16. The apparatus of claim 15, wherein the RS resource is a channel state information reference signal (CSI-RS) resource, a synchronization signal block (SSB) resource, or a combination thereof.

17. The apparatus of claim 16, wherein, in response to a CSI-RS resource and an SSB resource corresponding to the same spatial domain filter, the power value is determined by both the CSI-RS resource and the SSB resource.

18. The apparatus of claim 15, wherein the power value is a power offset, a downlink transmission power, or a downlink reception power.

19. The apparatus of claim 15, wherein the power value and a corresponding resource index are reported.

20. The apparatus of claim 15, wherein a plurality of power values are reported, and each power value of the plurality of power values is reported as an absolute power value or a differential power value.

* * * * *